R. VARLEY.
MAGNETO GENERATOR.
APPLICATION FILED APR. 26, 1919.

1,332,652.

Patented Mar. 2, 1920.
3 SHEETS—SHEET 1.

INVENTOR
Richard Varley
by M. A. Kelleh
his Attorney

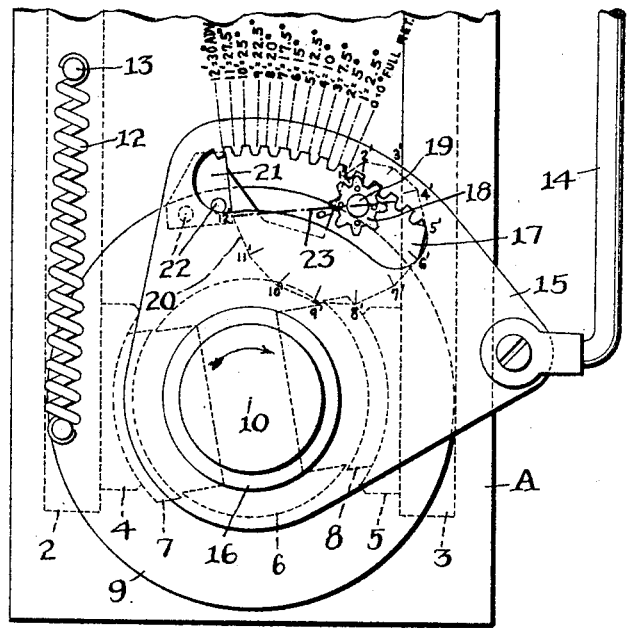

R. VARLEY.
MAGNETO GENERATOR.
APPLICATION FILED APR. 26, 1919.
1,332,652.
Patented Mar. 2, 1920.
3 SHEETS—SHEET 3.
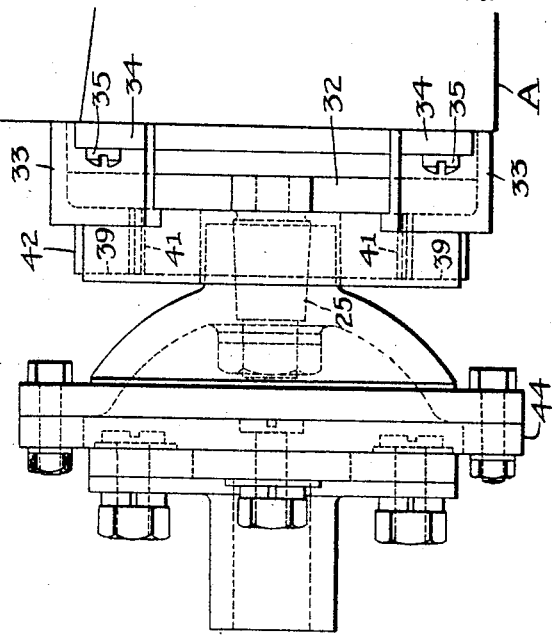
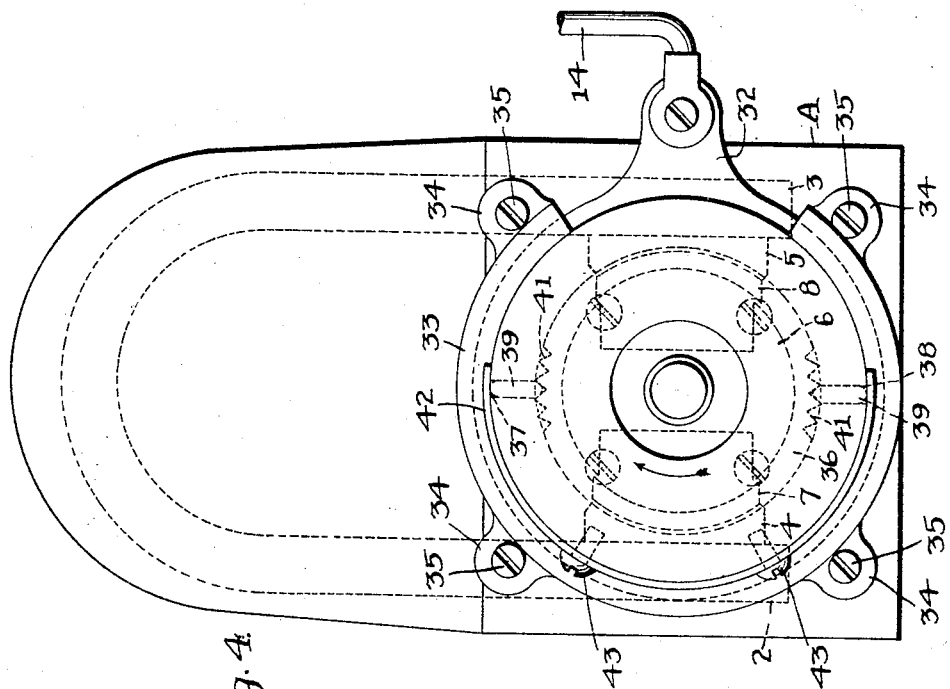
INVENTOR
Richard Varley
by M. A. Kellert
his attorney ative co-action of the magneto with the in-
UNITED STATES PATENT OFFICE.

RICHARD VARLEY, OF ENGLEWOOD, NEW JERSEY.

MAGNETO-GENERATOR.

1,332,652.     Specification of Letters Patent.     Patented Mar. 2, 1920.

Application filed April 26, 1919. Serial No. 292,916.

*To all whom it may concern:*

Be it known that I, RICHARD VARLEY, a citizen of the United States of America, residing at Englewood, in the county of Bergen and State of New Jersey, have invented new and useful Improvements in Magneto-Generators, of which the following is a full, clear, and exact description, reference being had to the accompanying drawings, which form part thereof.

This invention relates to ignition systems and is particularly concerned with the magneto generators thereof and more especially to that form known as the shiftable field pole type. An object is to provide means for accurately shifting to and properly retaining the field poles in the various positions necessary for obtaining the most effective co-action of the magneto with the internal combustion engine with which it is used, as is well understood to be a necessity by those skilled in this art.

Another object of the invention is the production of a structure in which the manually operated means for shifting the field poles will be relieved of the shocks resulting from the entrance of the armature poles into the substantial part of the magnetic field existing between the field poles.

Other objects and advantages will appear from the description of the invention which will be particularly pointed out in the appended claims.

Figure 2:
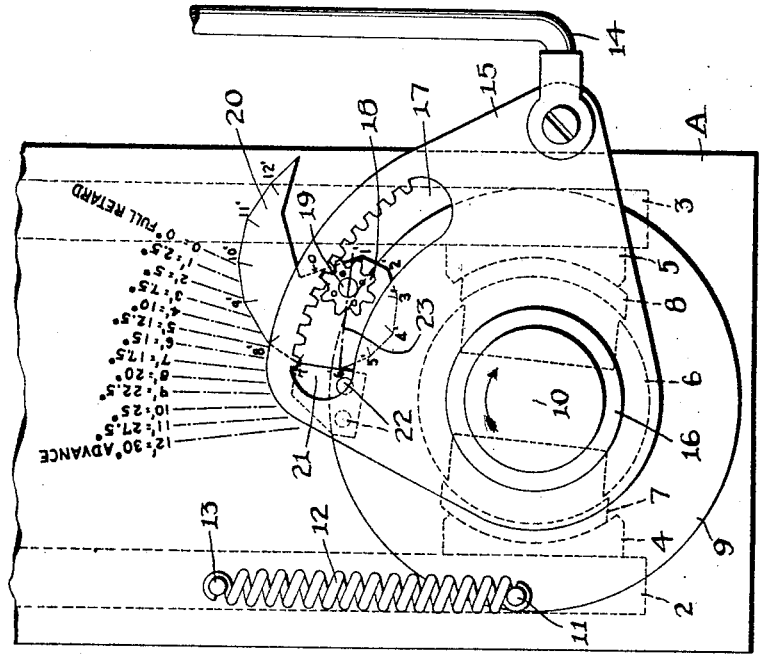
Figure 1:
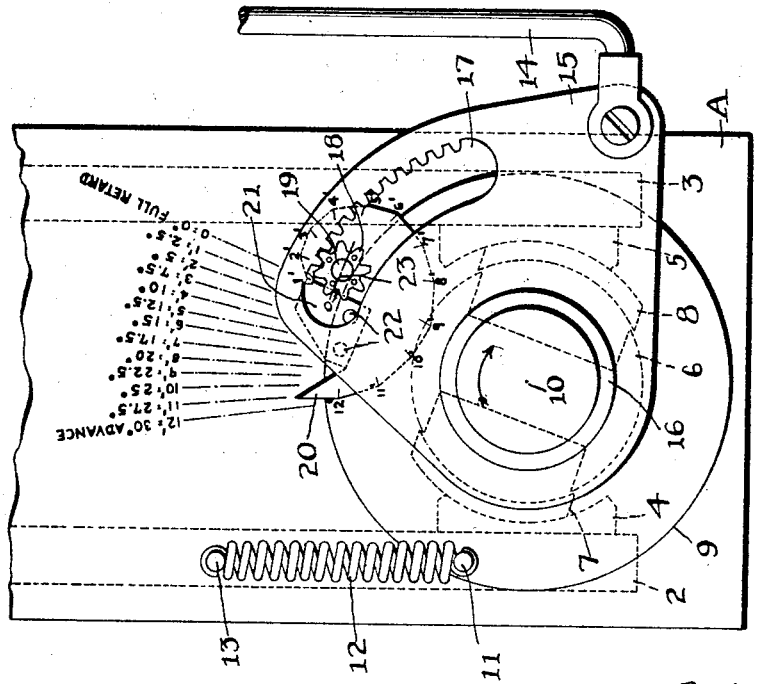

In the description reference is had to the accompanying drawings wherein I have illustrated a preferred embodiment of my invention, and wherein like characters of reference designate corresponding parts throughout the several views, and in which:

Figure 1 is a fragmentary diagrammatic end view of a magneto showing the field poles in the position of full retardation; Fig. 2 is a view corresponding to Fig. 1, but with the field poles in a 15° advance position; Fig. 3 is a view corresponding to Fig. 1, but with the field poles in a 30° advance or full advance position; Fig. 4 is a fragmentary diagrammatic view of a modified form of my invention in which an inertia weight is employed; and Fig. 5 is a fragmentary view of the device shown in Fig. 4 viewed from the right hand side of Fig. 4.

I will first describe the construction and operation of the form of my invention illustrated by Figs. 1 to 3 inclusive.

The letter "A" indicates a suitable supporting end plate or frame of a magneto. The poles 2 and and 3 each bear a pole piece as 4 and 5, either integral or suitably attached, which pole pieces, as is understood, are each formed with a curved face whose arc is generated by the end of a radius from the center of the magneto armature 6. The numerals 7 and 8 indicate the shiftable pole pieces which are employed to vary the point in the armature travel at which the armature will cut the maximum number of magnetic lines of force between the pole pieces. These pole pieces, as is well understood, are formed of magnetic material such as iron and are in form segments of an annulus as shown, the outer faces having a curvature corresponding with the inner faces of the pole pieces 4 and 5 and of approximately the same radius and the inner faces having a similar curvature but of a slightly less radius, in fact of such radius that the outer surface of the armature 6 when revolved just escapes touching them. These shiftable pole pieces are fastened in any suitable manner to a circular plate 9, rotatively mounted upon or about the armature shaft 10.

The circular end plate 9 is spring actuated, in the positions shown in the view, in a clockwise direction. This is accomplished in the preferred form shown, by means of a spring fixed at one end at 13 and at the other end fastened to the plate 9 at 11. The result of this construction is that the plate 9 carrying the shiftable pole pieces 7 and 8 when free is always moved to the extreme of its motion in a clockwise direction.

As is well understood by those skilled in the art of auto vehicles and magneto ignition, a magneto is frequently controlled by a hand lever positioned on the steering wheel of the vehicle and connected suitably to the magneto by a rod or like member. Such a rod is illustrated in the views by the numeral 14 which is suitably connected to a segment plate 15, as by a terminal and screw as shown.

The segment plate 15 is revolubly mounted on a hub 16 of the circular plate 9, consequently an up and down movement of rod 14 causes a rotative motion of segment plate 15 about the axis of the armature 6. The plate 15 is formed with a cut away portion 17 within which is positioned a small gear wheel 18 which meshes with gear teeth formed on the upper surface of the cut away portion. If, therefore, the segment plate is rotated the gear 18 is also rotated. The gear 18 is rigidly mounted upon a shaft 19, journaled in plate A. The shaft 19 also has rigidly mounted thereon the plural faced cam 20, so that a rotation of gear wheel 18 causes a rotation of cam 20.

The plural faced cam 20 has a plurality of faces designated 0, 1', 2', 3', 4', 5', 6', 7', 8', 10', 11', 12' although I do not intend by showing the specified number of cam faces to limit myself to that exact number. The faces of the cam are so positioned that they co-act with an abutment 21, fastened as by screws or rivets 22 to the circular shiftable pole pieces carrying plate 9.

With all parts as shown in Fig. 1, the shiftable pole pieces are in the position of maximum retardation or "full retard" as indicated by the angular values shown just above the cam. It is to be understood that the position of the parts shown may have a definite relation to the position of the crank shaft of the engine, as it is well understood, and that the magnetos used for ignition systems of internal combustion engines are usually directly geared thereto so that the armature of the magneto bears a definite relation to the different piston positions.

In the position as shown in Fig. 1, the cam face 0 is in contact with abutment 21. This contact is maintained because the spring 12 actuates plate 9 and abutment 21 in a clockwise direction and the cam 20 is held from turning by segment plate 15. It is also to be observed that the force exerted by abutment 21 against the cam face 0 is directly at right angles to the face of the abutment and the cam face and along a line which passes directly through the center of shaft 19. Consequently abutment 21 exerts no turning force on cam 20, and therefore creates no turning movement, which has to be resisted by rod 14 on the gear 18. This is most important and therein lies one of the features of my invention. This is so because as is well known, the rotating armature of a magneto at certain points in its travel exerts a blow (it might be called a magnetic blow) against the shiftable pole pieces. This shock or blow must be absorbed by the means carrying the shiftable pole pieces. In prior constructions this shock is transmitted more or less fully, to the adjusting means illustrated by rod 14. This is objectionable as it sets up undue wear of the parts and tends to misplace the movable poles. In my construction, however, the shaft 19 presents forces in the direction of armature travel from shifting the poles and from being transmitted to rod 14, because the forces exerted on the cam faces are directly at right angles thereto and on a line passing directly through the center of shaft 19.

The advantages pointed out with regard to the construction when the parts are in the positions shown by Fig. 1 also exist for every face of the cam. Thus, in Fig. 2, the cam has been rotated to obtain spark advance of fifteen degrees by an operation of the rod 14 so that the abutment 21 bears against the face 6'. In this position the line of action of the force exerted against the face 6' is at right angles to the beginning of this face and passes through the center of the shaft 19. In Fig. 3 the cam has been rotated by an operation of the rod 14 so that the abutment 21 bears against the face 12'. In this position (which may be that of full advance) of thirty degrees the line of action of the force exerted against the face 12' is also at right angles to the beginning of this face and passes through the center of the shaft 19. The line of action of the force exerted by abutment 21 against the cam faces is shown by the line 23 in each of the views of Figs. 1, 2 and 3 inclusive.

In Figs. 4 and 5 I show a modified form of my invention in which a band spring is employed to absorb shocks due to armature blows. In this form an annulus 32 is mounted so as to be rotated virtually about the axis of the armature 6 by being held in the circular frame 33 fastened by means of ears 34 and screws 35 to plate A. The annulus carries within its cut-away portion a disk 36 which just fits the annulus 32 but may rotate independently thereof. To this disk 36 are fastened in any suitable manner the shiftable pole pieces 7 and 8. In the annulus 32 are formed grooves or slots 37 and 38, in each of which is located a dog 39. These dogs have slightly beveled ends which fit into one of the teeth 41 formed in the disk 36. In order to keep the dogs in place a band spring 42 bears against their upper ends, this band spring being retained in any suitable manner as by screws 43.

By the construction last described it will be seen that motion of the rod 14 causes oscillation of the annulus 32 and by means of the spring-pressed dogs 39—39 a motion of the disk 36 and so of the pole pieces 7 and 8. However, if a severe blow is given to the pole pieces by the armature the disk 36 tends to revolve but this motion is resisted by the spring pressed dogs 39—39 which move outwardly against the tension of spring 42 sufficiently to absorb the shock before and without transmitting a force to the annulus 32 and placing a strain on rod 14.

The member indicated generally by the numeral 44 in Fig. 5 is the usual coupling which is used to drive the shaft 25 of the magneto.

Although throughout the description I have described my invention as applied to shiftable pole pieces, it is to be understood that I do not thereby desire to exclude its application in connection with equivalent means, such for instance as those devices in which the entire poles and frame is shiftable about the magneto armature and other similar constructions.

What I claim as new and desire to secure by Letters Patent of the United States is:

1. In a magneto, shiftable pole pieces, means for shifting the pole pieces, an armature and means for relieving the shifting means of armature blows on the pole pieces.

2. In a magneto, an armature, shiftable pole pieces, an operable member, means between the operable member and the shiftable pole pieces for transmitting motion from the operable member to the shiftable pole pieces, and adapted to prevent force exerted upon the shiftable pole pieces from being exerted upon the operable member.

3. In a magneto, an operable member, an oscillatable member, a cam formed with a plurality of operative faces, a shaft upon which the cam is mounted, means for driving the cam from the oscillatable member, an abutment for contact with the faces of the cam, the abutment and the cam faces being positioned so that force exerted upon the cam by the abutment acts in a line at right angles to the face of the cam and passes through the center of said shaft, an oscillatable plate carrying said abutment, pole pieces carried by the plate and a resilient means attached to the plate constantly acting to force the abutment against a cam face.

4. In a magneto, an operable member, an oscillatable member movable by the operable member, pole pieces carried by the oscillatable member, a body mounted for movement and adapted to positively engage the oscillatable member whereby armature blows on the pole pieces are absorbed by the said body without being transmitted to the operable member.

5. In a magneto, an operable member, a shiftable member formed with driving means, a cam formed with a plurality of operative faces, a shaft upon which the cam is mounted, means for driving the cam from the driving means of the shiftable member, when the last mentioned member is operated by the operable member, an abutment for contact with the faces of the cam, the abutment and the cam faces being positioned so that a force exerted upon the cam by the abutment acts in a line at right angles to the face of the cam and passes through the center of said shaft, a plate carrying said abutment, pole pieces carried by the plate and means for pressing the abutment against a cam face.

6. In a magneto, an operable member, a shiftable member formed with driving means, a cam formed with a plurality of operative faces, a shaft upon which the cam is mounted, means for driving the cam from the driving means of the shiftable member when the last mentioned member is operated by the operable member, an abutment for contact with the faces of the cam, the abutment and the cam faces being positioned so that a force exerted upon the cam by the abutment acts in a line at right angles to the face of the cam and passes through the center of said shaft, a plate carrying said abutment, pole pieces carried by the plate and means attached to the plate constantly acting to force the abutment against a cam face.

7. In a magneto, an operable member, a shiftable member formed with driving means, a cam formed with a plurality of operative faces, a shaft upon which the cam is mounted, means for driving the cam from the driving means of the shiftable member when the last mentioned member is operated by the operable member, an abutment for contact with the faces of the cam, the abutment and the cam faces being positioned so that a force exerted upon the cam by the abutment acts in a line at right angles to the face of the cam and passes through the center of said shaft, a plate carrying said abutment, pole pieces carried by the plate and a resilient means constantly acting to force the abutment against a cam face.

In testimony whereof I have hereunto set my hand.

RICHARD VARLEY.